(12) United States Patent
Caley et al.

(10) Patent No.: US 9,939,530 B2
(45) Date of Patent: Apr. 10, 2018

(54) OPTICAL SYSTEM FOR EXTENDED TIME OF FLIGHT RANGING

(71) Applicant: STMicroelectronics (Research & Development) Limited, Marlow (GB)

(72) Inventors: Adam Caley, Fife (GB); Colin Campbell, Darvel (GB); Christopher Townsend, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 419 days.

(21) Appl. No.: 14/685,656

(22) Filed: Apr. 14, 2015

(65) Prior Publication Data

US 2016/0306031 A1    Oct. 20, 2016

(51) Int. Cl.
| | |
|---|---|
| G01C 3/08 | (2006.01) |
| G01S 17/08 | (2006.01) |
| G01S 7/481 | (2006.01) |
| G01S 7/497 | (2006.01) |

(52) U.S. Cl.
CPC ............ G01S 17/08 (2013.01); G01S 7/4813 (2013.01); G01S 7/4814 (2013.01); G01S 7/4816 (2013.01); *G01S 7/4972* (2013.01)

(58) Field of Classification Search
CPC ...... G01S 17/08; G01S 7/4813; G01S 7/4814; G01S 7/4816; G01S 7/4972
See application file for complete search history.

(56) References Cited

U.S. PATENT DOCUMENTS

| 8,761,594 B1* | 6/2014 | Gross ................... H04N 5/2256 396/155 |
| 2010/0133424 A1* | 6/2010 | Lindsay ............. A63B 69/3658 250/237 R |
| 2010/0290025 A1* | 11/2010 | Parker ..................... G01S 7/497 356/3 |

OTHER PUBLICATIONS

Xia, Jianzhong, et al. "Structural Determination of Extem XH 1015 and Its Gas Permeability Comparison with Polysulfone and Ultem via Molecular Simulation". 2010. American Chemical Society. Ind. Eng. Chem. Res. 2010, 49, 12014-12021. http://pubs.acs.org/doi/pdfplus/10.1021/ie901906p.*

* cited by examiner

*Primary Examiner* — Samantha K Abraham
(74) *Attorney, Agent, or Firm* — Gardere Wynne Sewell LLP

(57) ABSTRACT

A time of flight detector includes an electromagnetic radiation emitter configured to emit a beam of radiation. A first optical element receives the beam of radiation and generates a collimated beam of radiation. A second optical element defines a narrow imaging field of view sufficient to capture reflected electromagnetic radiation from the collimated beam. An electromagnetic radiation sensor then senses the captured reflected electromagnetic radiation from the collimated beam in the narrow imaging field of view. Further narrowing of the imaging field of view is accomplished by selective enabling a sub-array of photosensitive elements with the electromagnetic radiation sensor.

18 Claims, 5 Drawing Sheets

OPTICAL SYSTEM FOR EXTENDED TIME OF FLIGHT RANGING

TECHNICAL FIELD

The present invention relates to systems which function to perform ranging detection using an optical emitter and detector.

BACKGROUND

Reference is made to FIG. 1 showing a conventional time-of-flight (ToF) type optical ranging system 10. The system 10 includes a support substrate 12. Mounted to a top surface of the support substrate 12 is an electromagnetic radiation emitter 14. The emitter 14 may, for example, comprise a vertical cavity surface-emitting laser (VCSEL) device. The emitter 14 emits a beam 16 of electromagnetic radiation at a desired wavelength (or range or wavelengths) that is operable to illuminate a target with an emission field of view (FOV) 18. Further mounted to the support substrate 12 is an integrated circuit sensor 20. The sensor 20 may, for example, comprise a photosensing region 22 including one or more single photo avalanche diodes (SPADs) which function as photosensitive elements (pixels) to detect the electromagnetic radiation that has been emitted from the emitter 14 in beam 16 and returned after being reflected by said target. To increase sensing resolution, the photosensing region 22 of the integrated circuit sensor 20 may include a plurality of SPADs arranged in an array format. The photosensing region 22 has a detection field of view (FOV) 24 which overlaps the emission field of view 18.

A body 26 of opaque encapsulating material (for example, a resin material) is provided on the support substrate in a position which protects the electromagnetic radiation emitter 14 and the integrated circuit sensor 20. A first opening 28 in the body 26 is provided at the location of the electromagnetic radiation emitter 14 to permit emission of the beam 16 towards the target. The first opening 28 may be closed or filled by a material which is transparent at the desired wavelength (or range or wavelengths) for the electromagnetic radiation emitted from the emitter 14. A second opening 30 in the body 26 is provided at the location of the photosensing region 22 facing the target. The second opening 30 may also be closed or filled by a material which is transparent at the desired wavelength (or range or wavelengths) for the electromagnetic radiation emitted from the emitter 14.

Operation of the system 10 is constrained from an optical perspective by two competing factors. The first factor is referred to as "absolute signal" and refers to a certain number of photons emitted from the emitter 14 which must be received (after target reflection) by the photosensing region 22 in a certain time period in order to achieve a desired characteristic of target detection (speed, accuracy, etc.). The second factor is referred to as "signal to noise" and refers to the relationship (for example, in the form of a ratio) between the reception of reflected radiation (the signal) and the reception of ambient light (the noise) which can degrade system performance. In designing the optics and operation of the ToF system, there is a need to balance these competing factors. Still further, there is a need to extend the range of target detection.

SUMMARY

In an embodiment, an apparatus comprises: a support substrate; an electromagnetic radiation emitter mounted to the support substrate and configured to emit a beam of radiation; an electromagnetic radiation sensor mounted to the support substrate; a first optical element mounted above the electromagnetic radiation emitter and configured to receive the beam of radiation and generate a collimated beam of radiation; and a second optical element mounted above the electromagnetic radiation sensor, the second optical element defining a narrow imaging field of view configured to capture reflected electromagnetic radiation from said collimated beam.

In an embodiment, a method comprises: emitting a beam of radiation from an electromagnetic radiation emitter; passing the beam of radiation through a first optical element to generate a collimated beam of radiation; passing reflected electromagnetic radiation from said collimated beam through a second optical element defining a narrow imaging field of view configured to capture reflected electromagnetic radiation from said collimated beam to generate an image; and sensing the image at an electromagnetic radiation sensor.

In an embodiment, a time of flight detector comprises: an electromagnetic radiation emitter configured to emit a beam of radiation; a first optical element configured to receive the beam of radiation from said emitter and generate a collimated beam of radiation; a second optical element defining a narrow imaging field of view configured to capture reflected electromagnetic radiation from said collimated beam; and an electromagnetic radiation sensor configured to sense the captured reflected electromagnetic radiation from said collimated beam in said narrow imaging field of view.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 1:
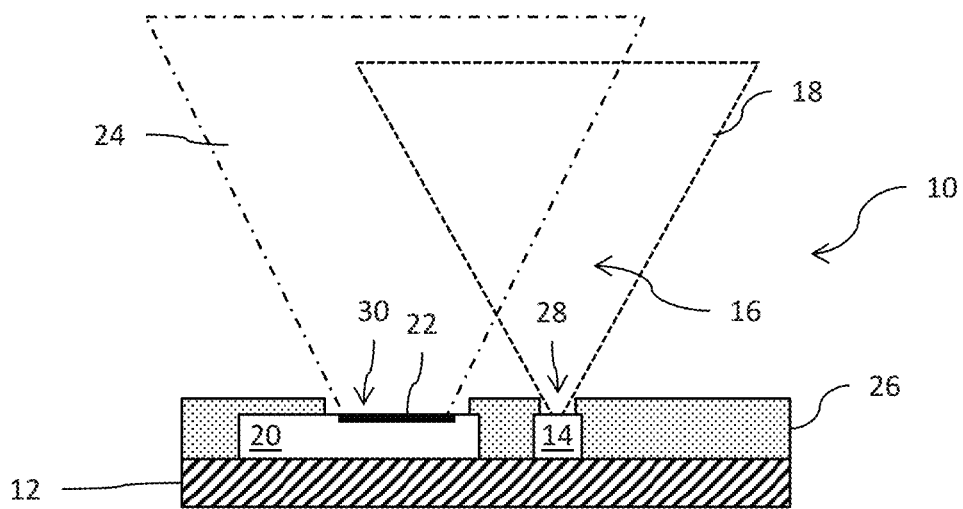
FIG. 1 is diagram illustrating a conventional time-of-flight type optical ranging system.
Figure 2:
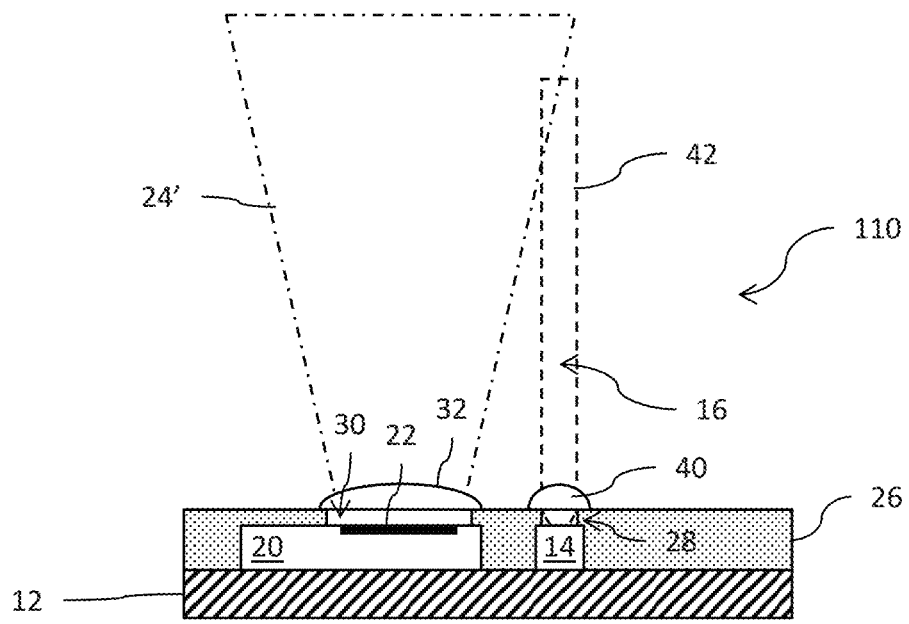
FIG. 2 is a diagram illustrating a modified time-of-flight type optical ranging system.

Reference is made to FIG. 2 showing a modified time-of-flight type optical ranging system 110. The system 110 is similar to the system 10 of FIG. 1 with like references referring to like parts.

To improve the absolute signal factor, it is important to maximize the size of the imaging aperture (defined by the size of the second opening 30 in the body 26) in order to let as much radiation pass as possible. However, increasing aperture size can adversely affect the signal to noise factor since an increase in the amount of desired radiation passing through second opening 30 to the photosensitive region 22 is accompanied by increased passage of undesired ambient radiation. In the implementation of FIG. 2, the system 110 includes a narrow angle imaging lens 32 provided over the second opening 30. As a result, the detection field of view (FOV) 24' is narrowed in relation to the system 10 of FIG. 1, with the narrowed field of view 24' serving to reduce the angles from which radiation is detectable by the photosensitive region 22 (for example, such a narrowed field of view is about) <8°. Indeed, the narrowed field of view 24' emphasizes capture of radiation from a direction toward the illuminated target with a reduction in the amount of ambient radiation passed. In this design, the aperture size is maximized within the mechanical constraints of the package, the size of the photosensitive region 22 and the design rules of the lens 32. The narrowed field of view 24' further serves to improve the signal to noise factor due to the relative reduction the reception of ambient radiation.

To further improve the signal to noise factor, the implementation of FIG. 2 includes a collimating lens 40 provided over the first opening 28. The lens 40 receives the electromagnetic radiation emitted from the emitter 14 (beam 16) and forms that radiation into a collimated beam 42. The beam 42 is operable to illuminate the target, with electromagnetic radiation emitted from the emitter 14 and returned after being reflected by said target forming an image that is captured by the narrow field of view lens 32 and detected by the photosensing region 22. The beam 42 presents an advantage over beam 16 (FIG. 1) of being able to illuminate a target and range further at lower power. In this context, the divergence angle for collimated electromagnetic radiation emission is about <6°.

The field of view 24' is further dictated by the focal length of the lens 32 and the size of the photosensing region 22 (which is related to the aperture size with opening 30).

Figure 3:
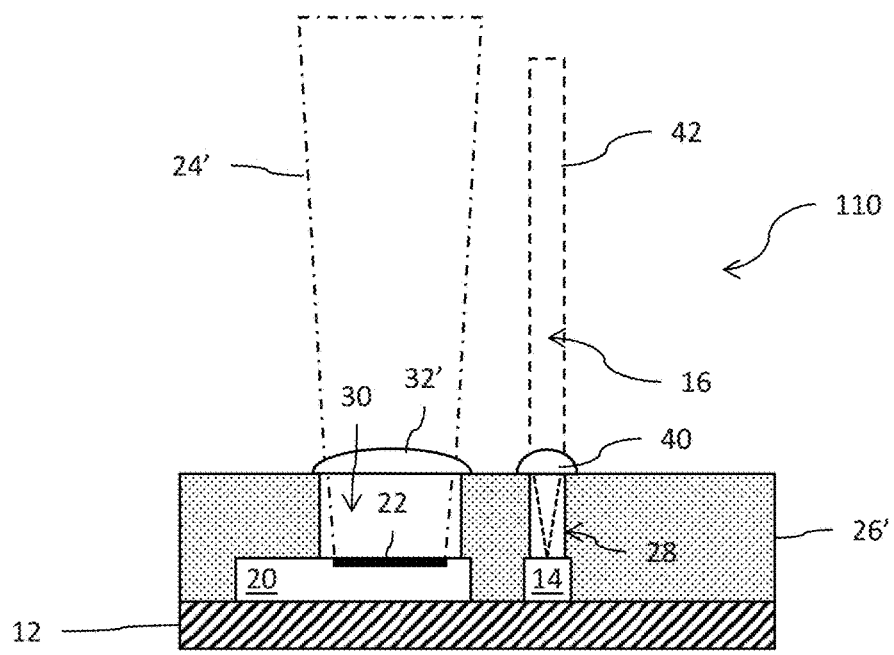
FIG. 3 is a diagram illustrating a modified time-of-flight type optical ranging system.

To further reduce the field of view 24' (to a value less than about 8°), a lens 32' with an increased focal length could be used. This implementation is shown in FIG. 3 with the use of a thicker body 26' of opaque encapsulating material. There may exist, however, limits on increased focal length (for example, limits placed on permitted package thickness). Thus, the selection of focal length must be balanced against other design and construction factors.

Figure 4:
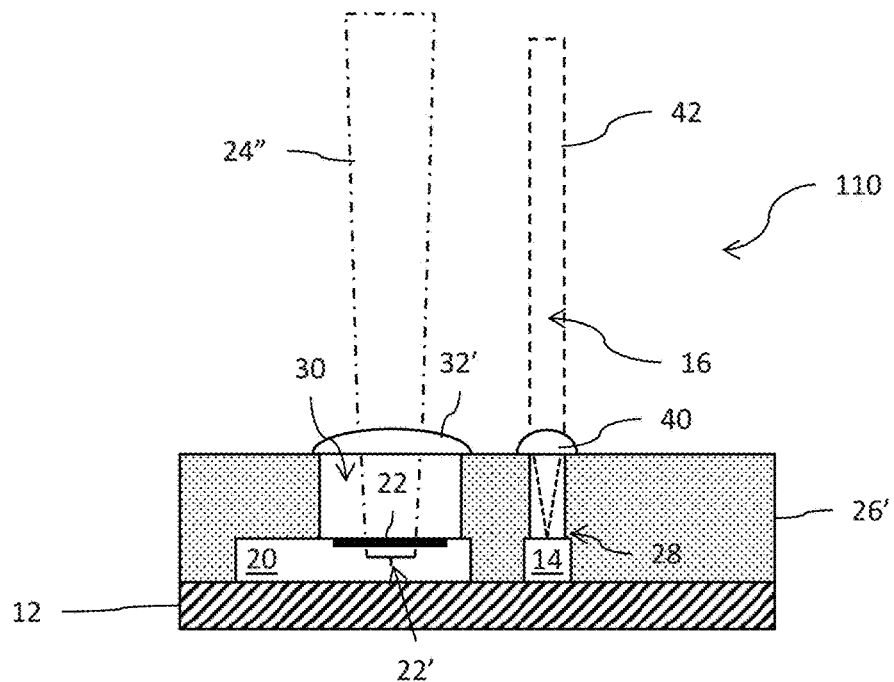
FIG. 4 is a diagram illustrating a modified time-of-flight type optical ranging system.

To still further reduce the field of view 24", a sub-array 22' within the photosensing region 22 may be selectively enabled for signal detection. This implementation is shown in FIG. 4.

Figure 5:
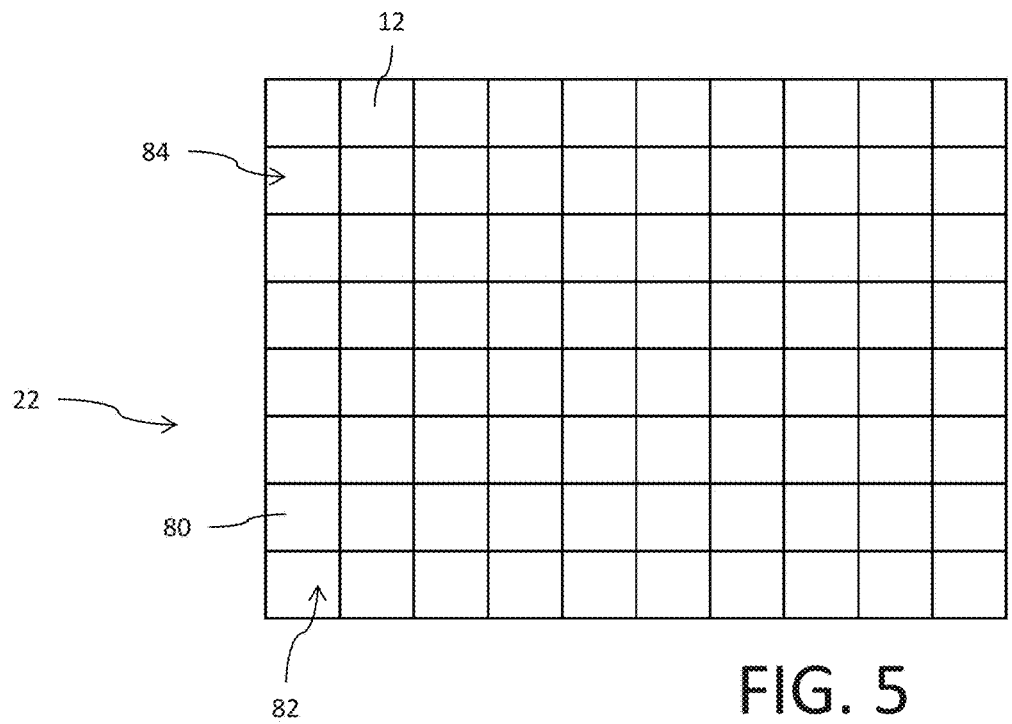
FIG. 5 illustrates an example of an arrayed layout of single photo avalanche diodes.

Reference is now made to FIG. 5 showing an example of an arrayed layout of single photo avalanche diodes (SPADs) 80 arranged in columns 82 and rows 84 for the photosensing region 22. The array in this example is 8×10, but it will be understood that the number of rows and columns may be selected in accordance with the application of the system.

Figure 6:
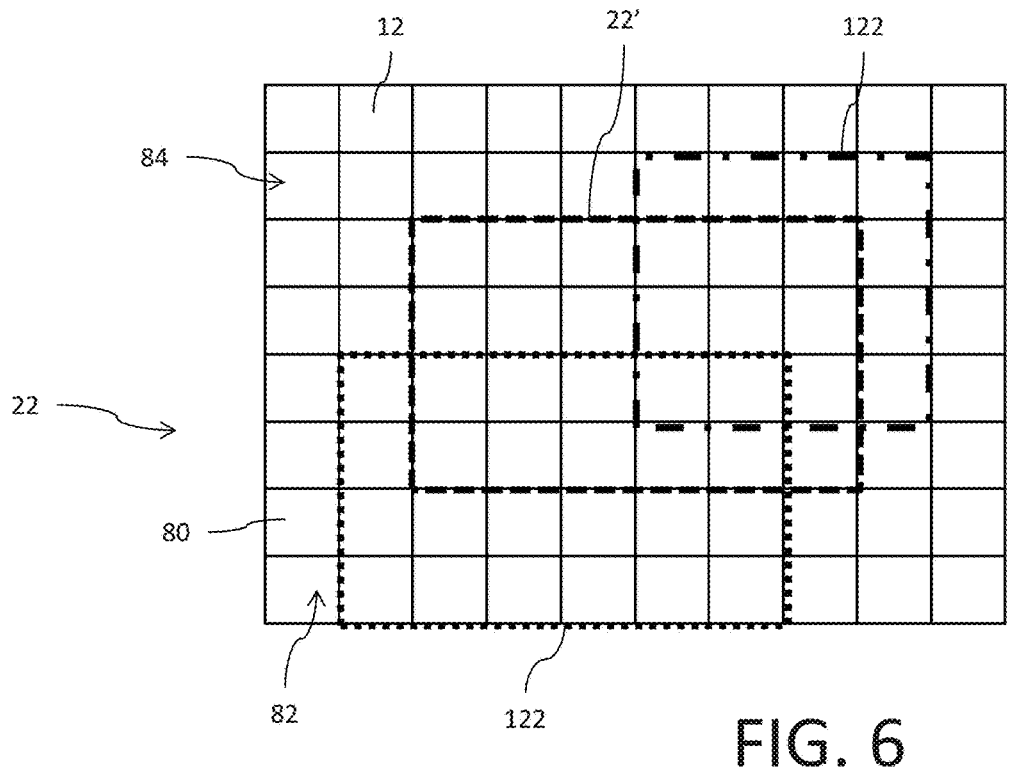
FIG. 6 illustrates selective enabling of individual sensing elements in a sub-array for reducing imaging field of view.

A control circuit of the sensor 20 is configured to operate the photosensing region 22 in two modes. In a first mode, all SPADs 80 of the photosensing region 22 are enabled to sense radiation. This mode corresponds to the configuration of FIG. 3. In a second mode, a restricted number of the SPADs 80 of the photosensing region 22 corresponding to sub-array 22' are enabled to sense radiation as shown in FIG. 6. This mode corresponds to the configuration of FIG. 4.

Although the selectively enabled sub-array 22' of SPADs 80 is shown in FIG. 6 as being centered within the overall array of the photosensing region 22, it will be understood that this is by example only. Indeed, in a further extension of the second mode, the specific SPADs 80 included within the sub-array 22' may be chosen on a system-by-system basis as a custom modification so as to account for alignment errors with respect to placement of the lens 32 relative to the opening 30 and region 22. This is illustrated in FIG. 6 by examples of sub-array regions 122 which could be selectively enabled by the control circuit of the sensor 20 in the second mode. In this context, it will be understood that the number of SPADs 80 included within the sub-array 22', 122 and the shape of the sub-array 22', 122 are configurable by the control circuit when operating in the second mode.

Figure 7:
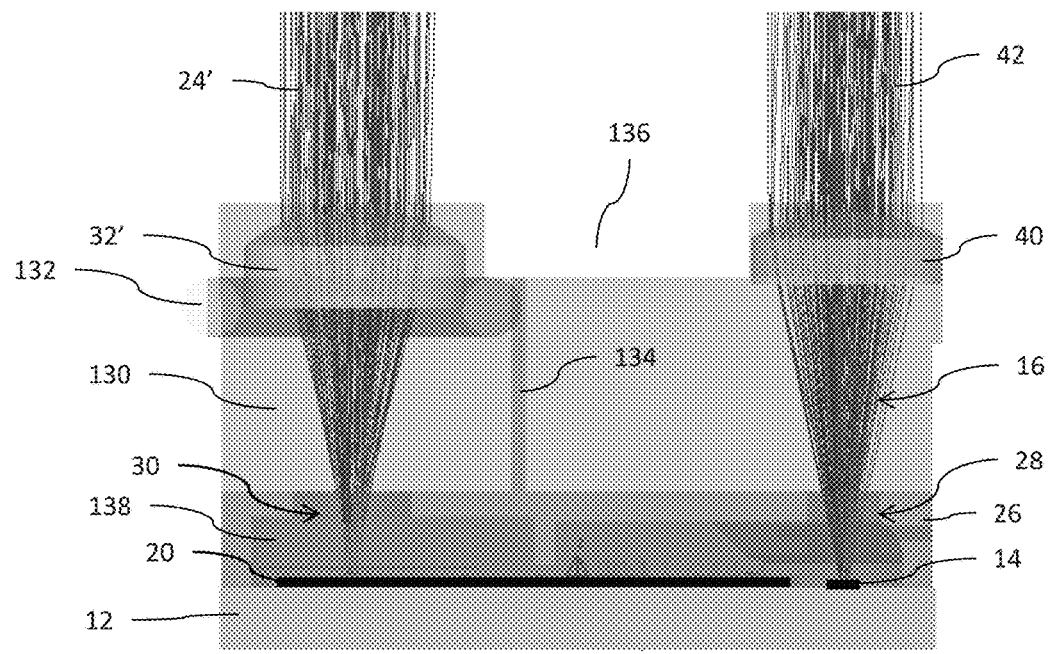
FIG. 7 is a diagram illustrating a modified time-of-flight type optical ranging system.
Figure 8:
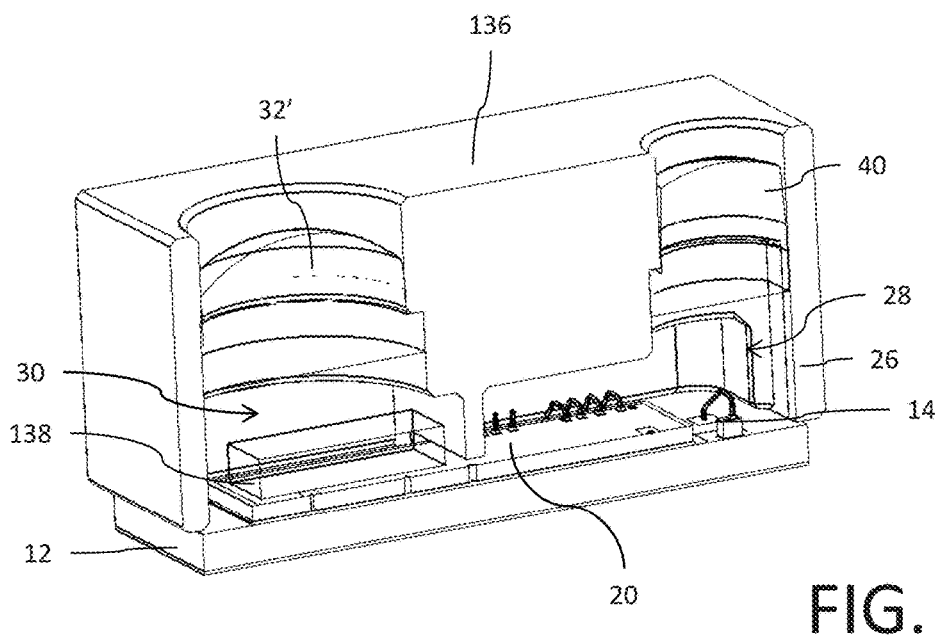
FIGS. 8-9 are perspective cross-sectional views of system embodiments.
Figure 9:
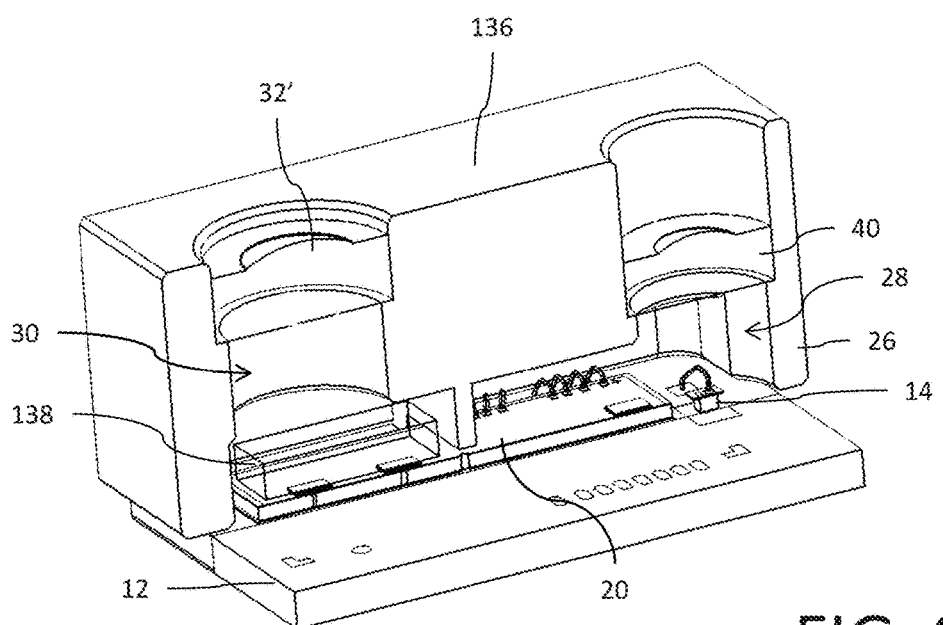

Reference is now made to FIG. 7 which illustrates in phantom shaded cross-section an implementation of the system 110 (FIG. 8 shows a corresponding perspective cross-sectional view). A perspective cut-away cross-sectional view of a slightly different embodiment is shown in FIG. 9 (differing mainly in the positioning of the lens 40). Like reference numbers refer to like or similar parts. To accommodate the lens 32' with an increased focal length, a transparent spacer 130 is provided over the opaque body 26. The thickness of the spacer 130 is selected based on the lens focal length. A baffle 132 encircles the lens 32'. An opaque barrier 134 is positioned within the spacer 130 between the emitter 14 and photosensing region 22. A housing 136 contains the parts of the system. The lenses 32' and 40 extend through openings formed in the housing 136. The photosensing region 22 may further be covered by a filter 138 (for example, of the infra-red pass type).

In an embodiment, the lens 40 for the emitter 14 may have a format of a plano-convex lens. Specifics of a first example of such a lens comprise: top surface diameter—0.9 mm; top surface radius of curvature—0.93227 mm; top surface conic constant—0.12262; top surface $4^{th}$ order asphere—-0.16877; top surface $6^{th}$ order asphere—0.42913; and top surface $8^{th}$ order asphere—-1.5632. The lens 40 may, for example, be made of an Extem 1015 material. Specifics of a second example of such a lens comprise: top surface diameter—0.65 mm; top surface radius of curvature—0.64942 mm; top surface conic constant--0.77327; top surface $4^{th}$ order asphere—-0.0174 top surface $6^{th}$ order asphere—1.2348; and top surface $8^{th}$ order asphere—-3.5918. The lens 40 may, for example, be made of a LBAL42 material.

In an embodiment, the lens 32' for the photosensing region 22 may have a format of a plano-convex lens. Specifics of a first example of such a lens comprise: top surface diameter—1.5 mm; top surface radius of curvature—1.073 mm; top surface conic constant—-0.85416; top surface $4^{th}$ order asphere—0.0308; top surface $6^{th}$ order asphere—0.004; and top surface $8^{th}$ order asphere—0.0. The lens 32' may, for example, be made of an Extem 1015 material. Specifics of a second example of such a lens comprise: top surface diameter—0.9 mm; top surface radius of curvature—0.95594 mm; top surface conic constant—-0.69788; top surface $4^{th}$ order asphere—0.02375; top surface $6^{th}$ order asphere—0.0063058; and top surface $8^{th}$ order asphere—0.0. The lens 40 may, for example, be made of a LBAL42 material.

The radius of curvature for each lens is selected such that in conjunction with the dimensions of the array for the photosensitive region that resulting field of view and emission divergence angles are narrow as described above.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. An apparatus, comprising:
a support substrate;
an electromagnetic radiation emitter mounted to the support substrate and configured to emit a beam of radiation;
an electromagnetic radiation sensor mounted to the support substrate, wherein the electromagnetic radiation sensor comprises a photosensing region formed of an array of photosensitive elements arranged in columns and rows;
a first optical element configured to receive the beam of radiation from the electromagnetic radiation emitter and output a collimated beam of radiation; and
a second optical element defining a narrow imaging field of view configured to capture reflected electromagnetic radiation from said collimated beam of radiation for output to said electromagnetic radiation sensor;
wherein the electromagnetic radiation sensor is configured to operate in a first mode wherein a plurality of photosensitive elements of the array are enabled for electromagnetic radiation detection of said reflected electromagnetic radiation with a first imaging field of view, and further configured to operate in a second mode wherein a sub-array of photosensitive elements of the array less than said plurality of photosensitive elements are enabled for electromagnetic radiation detection of reflected electromagnetic radiation from said collimated beam with a second imaging field of view that is narrower than the first imaging field of view.

2. The apparatus of claim 1, wherein the first optical element comprises a plano-convex lens element.

3. The apparatus of claim 1, wherein the second optical element comprises a plano-convex lens element.

4. The apparatus of claim 1, wherein the emitter and sensor function to perform a time of flight detection operation.

5. The apparatus of claim 1, wherein the narrow imaging field of view is less than 8° and a divergence of the collimated beam of radiation is less than 6°.

6. The apparatus of claim 1, wherein the first and second optical elements are made of an Extem material.

7. The apparatus of claim 1, wherein the first imaging field of view corresponds to said narrow imaging field of view and wherein the second imaging field of view corresponds to a fraction of said narrow imaging field of view.

8. A method, comprising:
emitting a beam of radiation from an electromagnetic radiation emitter;
passing the beam of radiation through a first optical element to generate a collimated beam of radiation;
passing reflected electromagnetic radiation of said collimated beam of radiation through a second optical element defining a narrow imaging field of view to generate an image;
sensing the image at an electromagnetic radiation sensor having a photosensing region formed of an array of photosensitive elements arranged in columns and rows;
operating the photosensing region in a first mode wherein a plurality of photosensitive elements of the array are enabled for electromagnetic radiation detection of reflected electromagnetic radiation with a first imaging field of view; and
operating the photosensing region in a second mode wherein a sub-array of photosensitive elements of the array less than said plurality are enabled for electromagnetic radiation detection of reflected electromagnetic radiation with a second imaging field of view narrower than the first imaging field of view.

9. The method of claim 8, wherein the first optical element comprises a plano-convex lens element.

10. The method of claim 8, wherein the second optical element comprises a plano-convex lens element.

11. The method of claim 8, wherein emitting and sensing are performed in connection making a time of flight detection.

12. The method of claim 8, wherein the narrow imaging field of view is less than 8° and a divergence of the collimated beam of radiation is less than 6°.

13. The method of claim 8, wherein the first imaging field of view corresponds to said narrow imaging field of view and wherein the second imaging field of view corresponds to a fraction of said narrow imaging field of view.

14. A time of flight detector, comprising:
an electromagnetic radiation emitter configured to emit a beam of radiation;
a first optical element configured to receive the beam of radiation from said emitter and generate a collimated beam of radiation;
a second optical element defining a narrow imaging field of view configured to capture reflected electromagnetic radiation from said collimated beam of radiation;
an electromagnetic radiation sensor configured to sense the captured reflected electromagnetic radiation from said collimated beam in said narrow imaging field of view, the electromagnetic radiation sensor including a photosensing region formed of an array of photosensitive elements arranged in columns and rows; and
wherein the electromagnetic radiation sensor is configured to operate in a first mode wherein a plurality of photosensitive elements of the array are enabled for electromagnetic radiation detection of the reflected electromagnetic radiation in a first imaging field of view, and further configured to operate in a second mode wherein a sub-array of photosensitive elements of the array less than said plurality are enabled for electromagnetic radiation detection of the reflected electromagnetic radiation with a second imaging field of view narrower than the first imaging field of view.

15. The time of flight detector of claim 14 further comprising:
a support substrate to which the emitter and sensor are mounted;
a body encapsulating the emitter and sensor, said body including a first opening for the emitter and a second opening for the sensor;
wherein the first optical element is supported by the body at the first opening; and
wherein second optical element is supported by the body at the second opening.

16. The apparatus of claim 14, wherein the narrow imaging field of view is less than 8° and a divergence of the collimated beam of radiation is less than 6°.

17. The apparatus of claim 14, wherein the first and second optical elements are made of an Extem material.

18. The apparatus of claim 14, wherein the first imaging field of view corresponds to said narrow imaging field of view and wherein the second imaging field of view corresponds to a fraction of said narrow imaging field of view.

\* \* \* \* \*